United States Patent [19]

Uchida

[11] 4,424,583
[45] Jan. 3, 1984

[54] PICKUP CARTRIDGE HAVING A RIBBED CANTILEVER

[75] Inventor: Masayoshi Uchida, Yokohama, Japan

[73] Assignee: Victor Company of Japan, Limited, Yokohama

[21] Appl. No.: 267,695

[22] Filed: May 27, 1981

[30] Foreign Application Priority Data

May 28, 1980 [JP] Japan ............................. 55-72572[U]

[51] Int. Cl.³ .............................................. H04R 1/18
[52] U.S. Cl. ..................................... 369/126; 369/170
[58] Field of Search ............... 369/170, 171, 172, 173, 369/126, 51; 29/150; 138/173, 109, 172; D14/27

[56] References Cited

U.S. PATENT DOCUMENTS

| D. 139,584 | 11/1944 | Jensen | 369/173 |
| 2,384,462 | 9/1945 | Goodman | 138/172 |
| 4,113,266 | 9/1978 | Alexandrovich | 369/173 |

*Primary Examiner*—Steven L. Stephan
*Attorney, Agent, or Firm*—Lowe, King, Price & Becker

[57] ABSTRACT

A pickup cartridge comprising a cantilever and a stylus attached to the free end of the cantilever. The cantilever is formed with a flat portion and a ribbed portion extending along the length of the flat portion so that the transverse cross-section of the cantilever is of a cruciform configuration. The flat and ribbed portions are dimensioned so that the cantilever tends to oscillate at a frequency different from the resonant frequencies of disc records.

5 Claims, 2 Drawing Figures

PICKUP CARTRIDGE HAVING A RIBBED CANTILEVER

BACKGROUND OF THE INVENTION

The present invention relates to a pickup cartridge for detecting analog or digital signals recorded along tracks of a disc record.

Conventional pickup cartridges comprises a cantilever one end of which is supported on a suspension mechanism and a stylus attached to the free end of the cantilever. The cartridge has its own particular resonant frequency when subject to vibration and if this resonant frequency coincides with the vibration of a disc record, the cartridge would vibrate violently and there results in not only difficulty to obtain accurate reproduction of recorded signals, but also impairment of the record surface by the violent movement of the sharply pointed stylus. In particular, capacitance detection type video disc records and the like which are spinned at a considerably high speed, are known to have a number of different resonant frequencies. It is necessary therefore that the pickup cartridge be constructed so as not to have its own resonant frequency coinciding with the various resonant frequencies of the record.

SUMMARY OF THE INVENTION

Accordingly, the primary object of the invention is to provide an improved pickup cartridge having a ribbed cantilever wherein the rib extends along the length of a flat portion. The rib and flat portions are dimensioned so that the cantilever may oscillate at a frequency which deviates from the resonant frequencies of the disc record.

According to a feature of the invention, the cantilever has a lightweight rigid construction which withstands bending, so that even if it should coincides in frequency with the vibration of record the stylus is prevented from moving violently and the surface of the record is thus not impaired.

BRIEF DESCRIPTION OF THE DRAWINGS

The invention will be further described in detail with reference to the accompanying drawings, in which.

DETAILED DESCRIPTION

Figure 1:
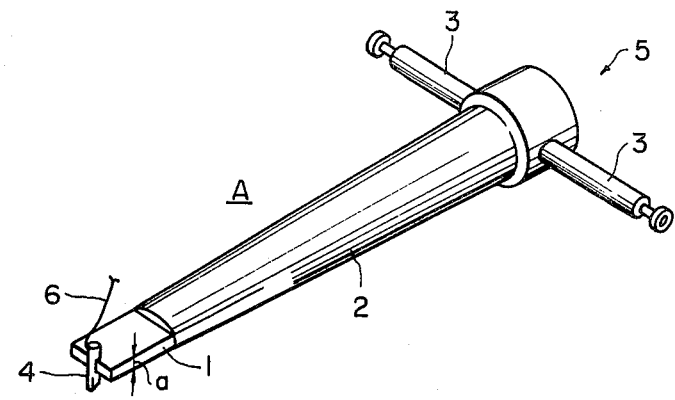
FIG. 1 is an illustration of a perspective view of a prior art pickup cartridge.

In FIG. 1 part of a prior art pickup cartridge is illustrated as comprising a cantilever A connected to a pair of suspension arms 3. The cantilever A is shaped to form a main cantilever 2 and a sub-cantilever 1. A stylus 4 is attached to the free end of the sub-cantilever 1 and electrically connected to an amplifier, not shown, by a connecting lead 6. The sub-cantilever 1 has a generally flat shape having a thickness "a". In order to prevent the resonant frequency of the cantilever A from coinciding with the resonant frequency of the disc record, the sub-cantilever 1 is machined to provide an appropriate value of thickness "a" by taking into account the following formula:

$$f = \frac{\lambda^2}{2\pi L^2} \sqrt{\frac{E \cdot I \cdot g}{j \cdot A}}$$

where,
- f = resonant frequency of the sub-cantilever 1;
- A = cross sectional area of the sub-cantilever;
- I = second moment of area about an axis perpendicular to the direction of vibrations;
- j = weight per unit volume of the sub-cantilever;
- E = modulus of longitudinal elasticity of the sub-cantilever;
- L = length of the sub-cantilever;
- g = gravitational acceleration; and
- $\lambda$ = constant.

Although the coincidence of resonant frequencies between the sub-cantilever 1 and the disc record can be avoided by appropriately determining its thickness value "a", it would have an undesirably increased weight or tend to become undesirably flexible causing it to vibrate violently in unison with the vibration of a disc record.

Figure 2:
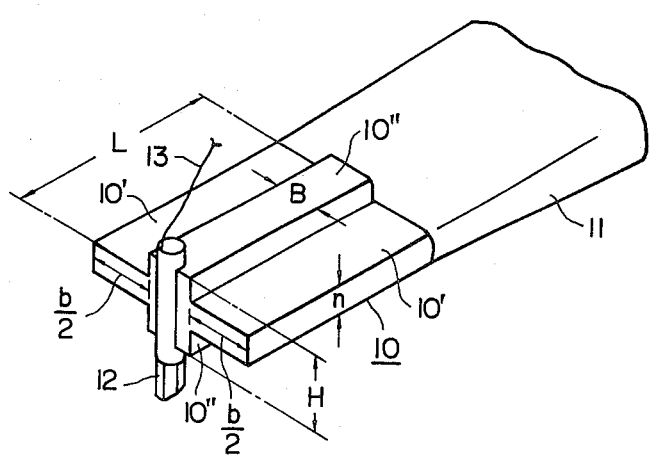
FIG. 2 is an illustration of the front end portion of a pickup cartridge constructed according to the invention.

FIG. 2 is an illustration of the embodiment of the invention which shows the forward end portion of the cantilever 10. The cantilever of the invention comprises a main cantilever 11 and a sub-cantilever 10 which is formed with at least one ribbed portion. In the illustrated embodiment, the sub-cantilever 10 is formed to have a pair of generally horizontally extending flat side portions 10' each having a thickness "h" and a width "b/2" and a pair of longitudinally extending upper and lower ribs 10" each having a width "B" and a height "(H-h)/2" from the respective surfaces of the flat portions 10'. Suitable values of the widths "B" and "b/2" are approximately 0.2 mm and 0.4 mm, respectively, and suitable values of the heights "h" and "(H-h)/2" are approximately 0.2–0.3 mm and 0.2 mm, respectively, the length "L" of the sub-cantilever 1 being approximately 4 mm. The stylus 12 is secured to a recess formed on the front end of the sub-cantilever where the flat portions 10' and ribs 10" cross each other, the stylus 12 being connected to an external circuit by a connecting lead 13.

By the formation of ribs 10" on the upper and lower surfaces of the flat portions 10', the second moment of area can be increased without signficantly increasing the total weight of the sub-cantilever 10, while at the same time avoiding the coincidence in resonant frequency with disc records. Since the sub-cantilever 10 has a generally cruciform transverse cross-section, it tends to vibrate with an amplitude significantly smaller than the vibration amplitude of the prior art sub-cantilever. Therefore, even if the resonant frequency of the sub-cantilever 10 should coincide with that of a disc record, the surface of the record is less likely to be impaired by the stylus.

While the foregoing description is concerned with a preferred embodiment of the invention, various modifications are apparent to those skilled in the art without departing from the scope of the invention which is only limited by the appended claims.

What is claimed is:

1. A pickup cartridge comprising a cantilever having one end thereof supported by a suspension means and a stylus attached to the free end of said cantilever for detecting signals from disc records, and a connecting wire attached to said stylus for conducting said detected signal to an external circuit, said cantilever being formed with a generally horizontally extending flat portion, said stylus extending at substantially a right angle to the plane of said flat portion, said cantilever being further formed with at least one rib portion extending in a longitudinal direction along said flat portion from said free end of the cantilever to inhibit oscillation of the cantilever at the resonant frequencies of said disc records with which said stylus is in contact.

2. A pickup cartridge as claimed in claim 1, wherein said flat portion has upper and lower surfaces and said rib portion is formed on each of the upper and lower surfaces of said flat portion.

3. A pickup cartridge as claimed in claim 1 or 2, wherein said cantilever comprises a main portion and a forward end portion having said flat and rib portions.

4. A pickup cartridge as claimed in claim 1, wherein the cantilever has a width that is greater than a width of said stylus.

5. The pickup cartridge as claimed in claim 3, wherein said forward end portion of the cantilever is perpendicular to the plane of the flat portion of said cantilever.

* * * * *

UNITED STATES PATENT OFFICE
CERTIFICATE OF CORRECTION

Patent No. 4,424,583    Dated January 3, 1984

Inventor(s) Masayoshi UCHIDA

It is certified that error appears in the above-identified patent and that said Letters Patent are hereby corrected as shown below:

Cover page, Item [73], in the listing of assignees, following "Yokohama", insert --, Japan--.

Signed and Sealed this

Twenty-fourth Day of April 1984

[SEAL]

Attest:

GERALD J. MOSSINGHOFF

Attesting Officer    Commissioner of Patents and Trademarks